United States Patent [19]

Nickel

[11] 4,387,050

[45] Jun. 7, 1983

[54] POLYAZO DYESTUFFS, A PROCESS FOR THEIR PREPARATION AND THEIR USE FOR DYEING VEGETABLE FIBRE MATERIALS AND LEATHER

[75] Inventor: Horst Nickel, Leverkusen, Fed. Rep. of Germany

[73] Assignee: Bayer Aktiengesellschaft, Leverkusen, Fed. Rep. of Germany

[21] Appl. No.: 204,985

[22] Filed: Nov. 7, 1980

[30] Foreign Application Priority Data

Nov. 29, 1979 [DE] Fed. Rep. of Germany ....... 2948022

[51] Int. Cl.$^3$ ........................................... C07C 105/00
[52] U.S. Cl. .................................. 260/143; 260/200; 260/198; 260/199; 260/196; 260/202; 260/207
[58] Field of Search ......................................... 260/143

[56] References Cited

U.S. PATENT DOCUMENTS 3,211,556 10/1965 Anderau .
3,915,952 10/1975 Sailer et al. ..................... 260/143 X

FOREIGN PATENT DOCUMENTS 2332310 6/1977 France ............................... 260/143
400417 4/1966 Switzerland ....................... 260/143

*Primary Examiner*—Charles F. Warren
*Assistant Examiner*—B. Boggs, Jr.
*Attorney, Agent, or Firm*—Sprung, Horn, Kramer & Woods

[57] ABSTRACT

Polyazo dyestuffs of the formula (I), and in particular those of the formulae (II) and (III), are obtained by co-reduction of the corresponding nitroazo compounds. The dyestuffs have a good affinity and a high brilliance and are particularly suitable for dyeing cotton and paper.

4 Claims, No Drawings

POLYAZO DYESTUFFS, A PROCESS FOR THEIR PREPARATION AND THEIR USE FOR DYEING VEGETABLE FIBRE MATERIALS AND LEATHER

The present invention relates to dyestuffs of the general formula

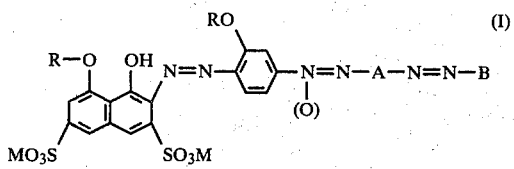

wherein
R denotes optionally substituted $C_1-C_4$-alkyl,
M denotes hydrogen or a cation and
A and B denote a radical of the benzene or naphthalene series,
to their preparation and use and to concentrated solutions thereof.

Examples of suitable cations are alkali metal cations, such as Li, Na and K, and $HN(R_1)_3$ cations, in which $R_1=H$ or optionally substituted $C_1-C_4$-alkyl, in particular hydroxy-substituted $C_1-C_4$-alkyl, and especially hydroxyethyl.

The benzene and naphthalene radicals can contain customary substituents, in particular sulpho groups.

A suitable substituent for R is, for example, hydroxyl.

Examples of suitable radicals A are $C_1-C_4$-alkoxy-1,4-phenylene, 1,4-phenylene and 2-chloro or cyano-1,4-phenylene.

Examples of suitable radicals B are hydroxynaphthylsulphonic acid and hydroxybenzene- or aminonaphthylsulphonic acid radicals which are optionally further substituted.

Dyestuffs which are to be singled out are those of the formula

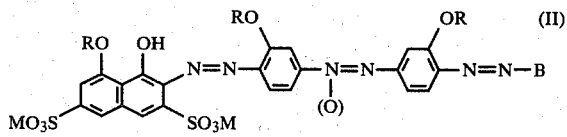

and especially those in which B=a radical of the sulphonaphthalene series, and those of the formula

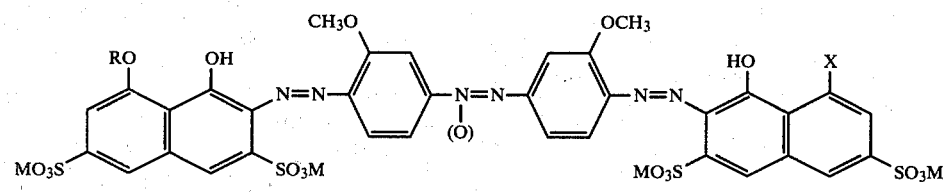

wherein X=a substituent, in particular $C_1-C_4$-alkoxy, hydroxyl, amino or acylamino.

Preferred acyl in this context is $C_1-C_4$-alkylcarbonyl or -sulphonyl and optionally substituted phenyl-carbonyl or -sulphonyl, such as acetyl, benzoyl, benzenesulphonyl and toluenesulphonyl.

The dyestuffs are prepared, for example, by co-reducing compounds of the formula

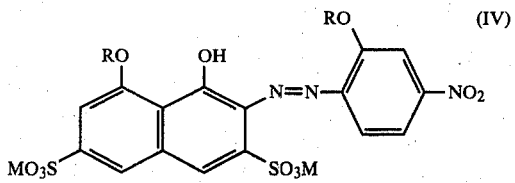

with nitroazo compounds of the formula $$O_2N-A-N=N-B \qquad (V)$$

in a known manner, such as is described, for example, in Houben-Weyl, Volume X/3, pages 346–349, Verlag Georg Thieme Stuttgart (1965).

Co-reducing different nitroazo compounds IV and V leads, of course, to dyestuff mixtures, the composition of which can be varied by the amount used (mol:mol or other molar ratios of 1 mol of IV to 0.5 mol of V) in order to obtain the desired dyestuff preparation, the colour shade, the solubility characteristics and other colouristic properties (fastness properties) chiefly being of industrial importance. An azo)azoxy dyestuff mixture, the composition of which can be changed by the conditions under which the nitroazo compounds are co-reduced, is in general obtained.

The nitroazo compounds IV are obtained by coupling diazotised 5-nitro-2-amino-alkoxybenzenes

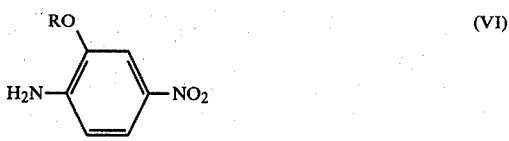

with 1-hydroxy-8-alkoxynaphthalene-3,6-disulphonic acids

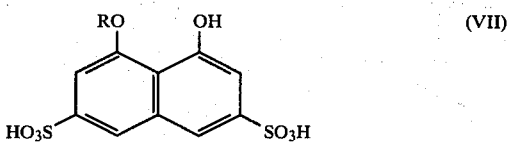

in the customary manner, preferably in an alkaline medium, using Na bases, K bases, Li bases or ammonium bases.

The nitroazo compounds V are obtained in the customary manner by coupling diazotised nitro-amines, for example VI, with coupling components B-H, in particular those of the hydroxynaphthalene series.

Concentrated dyestuff solutions are prepared in a known manner, for example by dissolving the dyestuff acid or a suitable (alkali metal or ammonium) salt in the desired solvent, preferably water or mixtures of water and water-miscible solvents, in particular alcohols, ethers and esters thereof and amides, or by co-reducing the nitroazo compounds to form a solution directly.

The dyestuffs are suitable for dyeing vegetable fibres and leather by the most diverse dyeing techniques. They are particularly suitable for dyeing cellulose materials, preferably cotton and paper (sized and unsized).

The dyestuffs are used both as powders or granular preparations and in the form of concentrated solutions.

The dyestuffs have a good affinity and good general fastness properties. The brilliance of the dyeings should be emphasised. Dyeings on paper are distinguished by good fastness to alum, acid and alkali.

EXAMPLE 16.8 g (0.1 mol) of 2-amino-5-nitro-anisole are stirred in 300 ml of water with 28 ml of 28% strength hydrochloric acid and are diazotised with 23.5 ml of 30% strength sodium nitrite solution at 15° C. in the customary manner.

34.8 g (0.1 mol) of 1-hydroxy-8-ethoxy-naphthalene-3,6-disulphonic acid are dissolved in 200 ml of water under neutral conditions and 130 ml of 20% strength sodium carbonate solution are added. The above solution of the diazonium salt of the nitro-amino-anisole is allowed to run into this solution of the coupling component in the course of about 10 minutes. The formation of foam is suppressed by adding a little anti-foaming agent. When the coupling has ended (after about 30 minutes), 80 ml of 40% strength sodium hydroxide solution are added to the red coupling solution and the mixture is warmed to 70°. A solution of 13.8 g of glucose in 40 ml of hot water is now added, whereupon the temperature rises somewhat, and the mixture is stirred for 30 minutes. When the co-reduction of the components has ended, the mixture is neutralised with about 90 ml of 28% strength hydrochloric acid and the product is salted out with 200 g of sodium chloride. The dyestuff which has precipitated is isolated and dried; when pulverised, it is a dark powder which dissolves in water giving a blue-coloured solution. The dyestuff dyes cotton in a clear reddish-tinged blue colour shade. Paper is also dyed in a reddish-tinged blue shade.

If 0.05 mol of the above nitroazo compound

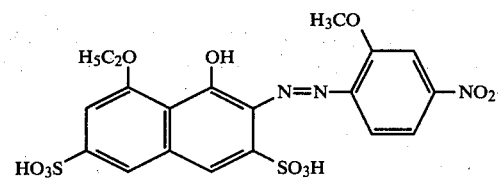

and 0.05 mol of the second nitroazo component indicated in the table are used, co-reducing the compounds analogously to the process described above gives dyestuffs with the colour shade indicated in the last column.

| 2nd nitroazo component | Colour shade |
|---|---|
| 2-methoxy-4-nitrophenylazo coupled to 1,8-dihydroxy-naphthalene-3,6-disulphonic acid (OCH₃; O₂N–C₆H₃–N=N–; OH, OH; HO₃S, SO₃H) | blue |
| 2-methoxy-4-nitrophenylazo coupled to 8-amino-1-hydroxy-naphthalene-3,6-disulphonic acid | blue |
| same diazo, coupling partner 8-acetylamino-1-hydroxy-naphthalene-3,6-disulphonic acid (NH–COCH₃) | blue |
| same diazo, coupling partner 8-benzoylamino-1-hydroxy-naphthalene-3,6-disulphonic acid (NH–CO–C₆H₅) | blue |
| same diazo, coupling partner 8-(phenylsulphonylamino)-1-hydroxy-naphthalene-3,6-disulphonic acid (NH–SO₂–C₆H₅) | blue |
| same diazo, coupling partner 8-(p-tolylsulphonylamino)-1-hydroxy-naphthalene-3,6-disulphonic acid (NH–SO₂–C₆H₄–CH₃) | blue |
| same diazo, coupling partner 6-amino-1-hydroxy-naphthalene-3-sulphonic acid (HO, NH; HO₃S, SO₃H) | reddish-tinged blue |
| same diazo, coupling partner 8-amino-1-hydroxy-naphthalene-4-sulphonic acid (HO, NH₂; SO₃H) | blue |
| same diazo, coupling partner 8-amino-1-hydroxy-naphthalene-2,4-disulphonic acid (HO, NH₂, SO₃H; SO₃H) | blue |
| same diazo, coupling partner 8-amino-1-hydroxy-naphthalene-2,4-disulphonic acid (SO₃H (0.04 mol); SO₃H) | blue |
| same diazo, coupling partner 8-amino-1-hydroxy-naphthalene-3,5-disulphonic acid (HO, NH₂; HO₃S, SO₃H) | blue |

| 2nd nitroazo component | Colour shade |
|---|---|
| (structure: 2-OCH₃-4-O₂N-C₆H₃-N=N- coupled to 1-hydroxy-4-NHCOCH₃-naphthalene with SO₃H groups) | blue |
| (structure: 2-OCH₃-4-O₂N-C₆H₃-N=N- coupled to 1-hydroxy-6-NHCOCH₃-naphthalene-3-SO₃H) | reddish-tinged blue |
| (structure: 2-OCH₃-4-O₂N-C₆H₃-N=N- coupled to 1-hydroxy-6-NH₂-naphthalene-3-SO₃H) | reddish-tinged blue |
| (structure: 2-OCH₃-4-O₂N-C₆H₃-N=N- coupled to 1-hydroxy-6-NHCOCH₃-naphthalene-3-SO₃H variant) | reddish-tinged blue |
| (structure: 2-OCH₃-4-O₂N-C₆H₃-N=N- coupled to naphthalene with OH, NH-C₆H₄-SO₃H, S) | blue |
| (structure: 2-OCH₃-4-O₂N-C₆H₃-N=N- coupled to naphthalene with OH, NH₂, S, SO₃H) | reddish-tinged blue |
| (structure: 2-OCH₃-4-O₂N-C₆H₃-N=N- coupled to 2-hydroxy-naphthalene-3,6-disulfonic acid) | violet |
| (structure: 2-OCH₃-4-O₂N-C₆H₃-N=N- coupled to 1-amino-naphthalene-6-sulfonic acid-2-position) | violet |
| (structure: 2-OCH₃-4-O₂N-C₆H₃-N=N- coupled to 2-hydroxy-naphthalene-6-SO₃H) | violet |
| (structure: 2-OCH₃-4-O₂N-C₆H₃-N=N- coupled to 2-hydroxy-3-COOH-naphthalene) | violet |

| 2nd nitroazo component | Colour shade |
|---|---|
| (structure: 2-OCH₃-4-O₂N-C₆H₃-N=N- coupled to 1-hydroxy-naphthalene-4-SO₃H) | violet |
| (structure: 2-OCH₃-4-O₂N-C₆H₃-N=N- coupled to 4-hydroxy-3-COOH-phenyl) | blue-grey |
| (structure: 4-O₂N-C₆H₄-N=N- coupled to 4-hydroxy-3-COOH-phenyl) | blue-grey |
| (structure: 4-O₂N-C₆H₄-N=N- coupled to 2-CH₃-4-hydroxy-5-COOH-phenyl) | blue-grey |
| (structure: 2-Cl-4-O₂N-C₆H₃-N=N- coupled to 4-hydroxy-3-COOH-phenyl) | blue-grey |
| (structure: 2-CN-4-O₂N-C₆H₃-N=N- coupled to 4-hydroxy-3-COOH-phenyl) | blue-grey |
| (structure: 2-Br-4-O₂N-C₆H₃-N=N- coupled to 4-hydroxy-3-COOH-phenyl) | blue-grey |
| (structure: 2-Cl-4-O₂N-6-Br-C₆H₂-N=N- coupled to 4-hydroxy-3-COOH-phenyl) | blue-grey |
| (structure: 2,6-Cl₂-4-O₂N-C₆H₂-N=N- coupled to 2-CH₃-4-hydroxy-5-COOH-phenyl) | blue-grey |
| (structure: 2-CF₃-4-O₂N-C₆H₃-N=N- coupled to 1-amino-4-hydroxy-naphthalene-6-SO₃H) | violet |
| (structure: 4-O₂N-C₆H₄-N=N- coupled to 1-hydroxy-8-NHCOCH₃-naphthalene-3,6-disulfonic acid) | violet |

-continued

| 2nd nitroazo component | Colour shade |
|---|---|
| (structure: O₂N—⟨Cl⟩—N=N—naphthalene(HO)(NH—CO—Ph)(HO₃S)(SO₃H)) | violet |
| (structure: O₂N—⟨Cl⟩—N=N—naphthalene(OH)(OH)(HO₃S)(SO₃H)) | reddish-tinged blue |

To prepare a dyestuff solution, 0.1 mol of 2-amino-5-nitro-anisole are diazotised as described above and the diazotisation product is coupled with 0.1 mol of 1-hydroxy-8-ethoxy-naphthalene-3,6-disulphonic acid.

The monoazo dyestuff is isolated by salting out with sodium chloride. The dyestuff paste obtained is introduced into a solution, warmed to about 90°, of 175 ml of water and 55 g of urea and the mixture is stirred. 17.5 g of glucose are added at 65°, followed by 35 ml of 40% strength sodium hydroxide solution: exothermic reaction (rise in temperature to about 75°). The colour shade then changes from red to blue. The mixture is stirred for about a further half an hour and the solution formed is then clarified, a little filtration auxiliary (for example DK-Perl ®) being added if appropriate. The solution is adjusted to the required tinctorial strength with water. It is a colour solution which is stable to low temperature and is preferably employed for dyeing paper (in blue shades).

I claim:

1. Dyestuffs of the formula

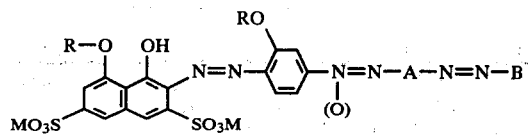

wherein
R denotes optionally substituted $C_1$-$C_4$-alkyl,
M denotes hydrogen or a cation and
A and B denote a radical of the benzene or naphthalene series.

2. Dyestuffs of the formula

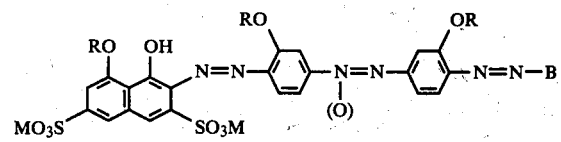

3. Dyestuffs of claim 2, in which B=a radical of the sulphonaphthalene series.

4. Dyestuffs of the formula

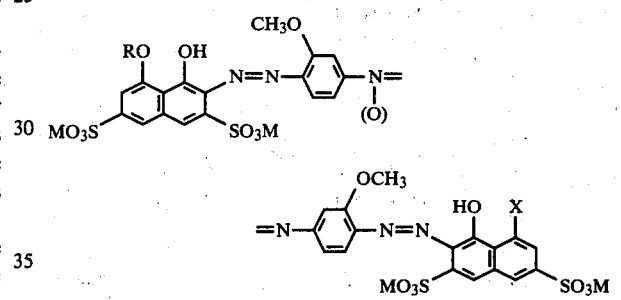

wherein X=a substituent, in particular $C_1$-$C_4$-alkoxy, hydroxyl, amino or acylamino.

* * * * *